United States Patent
Suzuki

(10) Patent No.: US 7,551,381 B2
(45) Date of Patent: Jun. 23, 2009

(54) DEVICE AND METHOD FOR READING DATA FROM AND WRITING DATA IN STORAGE MEDIUM

(75) Inventor: Hiroyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 55 days.

(21) Appl. No.: 11/149,529

(22) Filed: Jun. 10, 2005

(65) Prior Publication Data

US 2006/0181809 A1     Aug. 17, 2006

(30) Foreign Application Priority Data

Feb. 14, 2005  (JP)  ............................. 2005-036629

(51) Int. Cl.
| | | |
|---|---|---|
| G11B 15/04 | (2006.01) | |
| G11B 19/04 | (2006.01) | |
| G11B 21/02 | (2006.01) | |
| G11B 5/55  | (2006.01) | |
| G11B 21/08 | (2006.01) | |

(52) U.S. Cl. ......................... 360/60; 360/75; 360/265.1
(58) Field of Classification Search ....................... None
See application file for complete search history.

(56) References Cited

U.S. PATENT DOCUMENTS

| | | | | |
|---|---|---|---|---|
| 6,108,156 A |   | 8/2000 | Lee et al. ....................... 360/75 |
| 6,151,187 A | * | 11/2000 | Ogawa ..................... 360/78.14 |
| 6,721,121 B1 | * | 4/2004 | Schreck et al. ........... 360/77.02 |
| 6,781,786 B2 |   | 8/2004 | Ishii ......................... 360/78.04 |
| 7,054,090 B2 |   | 5/2006 | Ikeda et al. .................... 360/75 |
| 7,133,237 B2 |   | 11/2006 | Ikeda et al. .................... 360/79 |
| 7,209,310 B1 | * | 4/2007 | Tsai et al. ...................... 360/75 |
| 2003/0156347 A1 | * | 8/2003 | Ishii ......................... 360/78.04 |
| 2004/0095671 A1 |   | 5/2004 | Ikeda et al. |

FOREIGN PATENT DOCUMENTS

| | | | |
|---|---|---|---|
| JP | 4-301274 |   | 10/1992 |
| JP | 04301274 A | * | 10/1992 |
| JP | 10-340551 |   | 12/1998 |
| JP | 2003-45132 |   | 2/2003 |

(Continued)

OTHER PUBLICATIONS

Translation of Japanese Patent No. 04301274 (Feb. 2008).*

(Continued)

*Primary Examiner*—Joseph H Feild
*Assistant Examiner*—Daniell L Negrón
(74) *Attorney, Agent, or Firm*—Kratz, Quintos & Hanson, LLP.

(57) ABSTRACT

A disk device writes data in or reads data from a disk. The disk device includes a head. The head includes a reading element that reads data from the disk and a writing element that writes data in the disk. The reading element and the writing element are placed apart from each other. For example, the writing element is arranged nearer to the outer periphery of the disk than the reading element is. The disk device includes two stoppers that restrict the movement of the head. The stoppers are arranged such that, when the head moves over the disk, a specific area on the disk is accessible only to the reading element and not to the writing element. Thus, data can be read from the specific area but cannot be written in the specific area.

6 Claims, 3 Drawing Sheets

FOREIGN PATENT DOCUMENTS

| | | |
|---|---|---|
| JP | 2003-249044 | 9/2003 |
| JP | 2004-30777 | 1/2004 |
| JP | 2004-158085 | 6/2004 |

OTHER PUBLICATIONS

H. Okamura; "Structure and Practical Applications of Hard Disk Device-Principles and Mechanism of Recording/Reproducing & Interface" *ISBN4-7879-3622-4, P90-93*; May 1, 2002; pp. 90-93 (2 Sheets) and Partial translation (5 Sheets)./Discussed in the specification.

Japanese Office Action mailed Oct. 14, 2008, including a partial English translation.

* cited by examiner

HEAD RECORDING

MAGNETIC TRANSFER

DEVICE AND METHOD FOR READING DATA FROM AND WRITING DATA IN STORAGE MEDIUM

BACKGROUND OF THE INVENTION

1) Field of the Invention

The present invention relates to a technology for identifying a servo track writer (STW) device used for servo track writing on a disk.

2) Description of the Related Art

The disks of magnetic disk devices are subjected to servo track writing prior to shipping. "Structure and Practical Applications of Hard Disk Device—Principles and Mechanism of Recording/Reproduction & Interface", published in CQ, issue no. ISBN4-7879-3622-4, P90-93 by Hiroshi Okamura discloses servo track writing. The servo track writing is a process by which head position information, servo information, etc. (hereinafter, "STW information") are recorded on the disk and is carried out by a dedicated device (hereinafter "STW device").

FIG. 6A and FIG. 6B are schematics for explaining the servo track writing. The STW device records the STW information on a magnetic disk with the aid of the magnetic head, and, with the aid of a magnet, transfers the STW information to other magnetic disks from a master medium already having the STW information recorded thereon.

Thus, by using the STW device for servo track writing, the magnetic disk device accomplishes the task of servo track writing more precisely than would be the case if the magnetic disk device itself were to carry out servo track writing. Consequently, defects in the magnetic disk device can be forestalled.

Further, a bar code is affixed to a post-shipment magnetic disk device to make it possible to identify the STW device that was used for servo track writing on the disk. Thus, in case of any malfunctioning of the magnetic disk device, the bar code can be used to identify the defective STW device.

However, conventional technology does not always assure correct identification of the defective STW device.

The reason for this is that the bar code affixed to the magnetic disk device is easily damaged during handling, causing it come off or become worn. Consequently, the information recorded on the bar code cannot be read properly. Further, since the bar code is merely affixed to the magnetic disk device, any unauthorized person may tamper with the bar code information, leading to security breach.

This problem may be countered by recording on the disk an identification information of the STW device. However, since formatting the magnetic disk device erases the identification information, this method is not an appropriate solution.

SUMMARY OF THE INVENTION

It is an object of the present invention to at least solve the problems in the conventional technology.

According to an aspect of the present invention, a storage medium read/write device that reads data from or writes data to a storage medium includes a read/write unit that performs reading of data from and writing of data to the storage medium with the aid of a head provided with a writing member and a reading member placed apart from each other, the reading member being used for reading data and the writing member being used for writing data; and a restricting unit that restricts a range of movement of the head such that a protected area on the storage medium is accessible to the reading member and not to the writing member.

According to another aspect of the present invention, a method of reading/writing of data from/to a storage medium includes reading/writing data from/to the storage medium with the aid of a head provided with a writing member and a reading member placed apart from each other, the reading member being used for reading data and the writing member being used for writing data; and restricting a range of movement of the head such that a protected area on the storage medium is accessible to the reading member and not to the writing member.

The other objects, features, and advantages of the present invention are specifically set forth in or will become apparent from the following detailed description of the invention when read in conjunction with the accompanying drawings.

DETAILED DESCRIPTION

Exemplary embodiments of the present invention are explained next with reference to the accompanying drawings.

A disk device according to an embodiment of the present invention is explained in general. It is assumed that disk device is a storage medium read/write device. The disk device includes a head having a reading element and a writing element. The reading element and the writing element are placed apart from each other. When the head of the disk device reads data from or writes data to a disk, the disk device restricts the range of head movement, and, by doing so, provides an area (hereinafter, "protected area") on the disk accessible only to the reading element and not to the writing element.

By storing important data (such as identification information of STW device, encryption key information, etc.) in the protected area, erasure or tampering of the data can be prevented.

Figure 1:
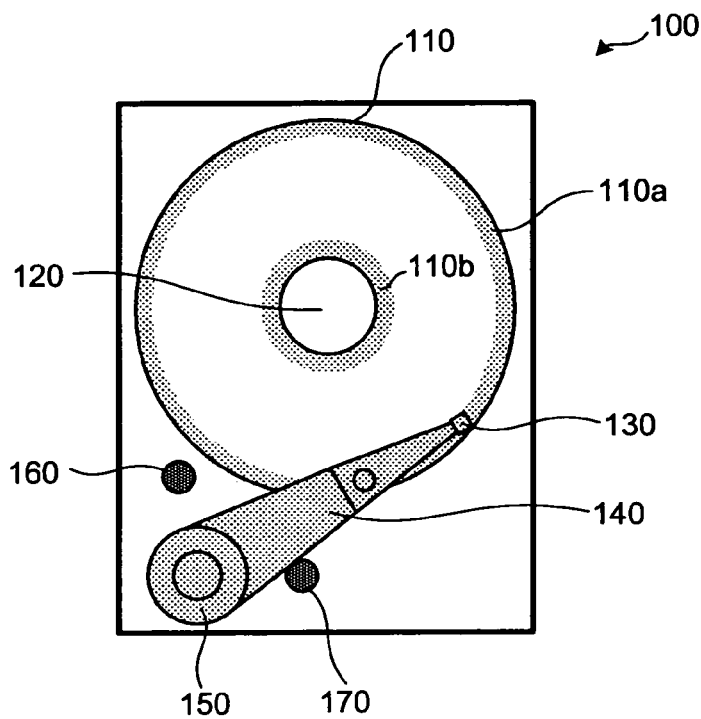
FIG. 1 is a schematic of a disk device according to an embodiment of the present invention.

FIG. 1 is a schematic of a disk device 100 according to the present embodiment. The disk device 100 includes a disk 110, a spindle motor 120, a head 130, an arm 140, a step-up motor 150, an inner stopper 160, and an outer stopper 170.

The disk 110 is a metal disk (or a plastic disk) coated or deposited with a magnetic material, and stores and records data. The spindle motor 120 spins the disk 110.

The head 130 reads data from and writes data to the disk 110. The head 130 includes a writing element (not shown) that writes data to the disk 110 and a reading element (not shown) that reads data from the disk 110. The reading element and the writing element are placed apart from each other.

Figure 2:
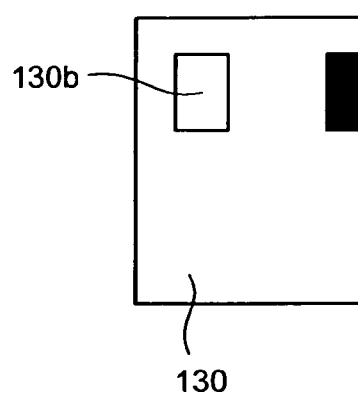
FIG. 2 is a schematic for explaining an example of relative positions of a writing element and a reading element of a head shown in FIG. 1.
Figure 2:
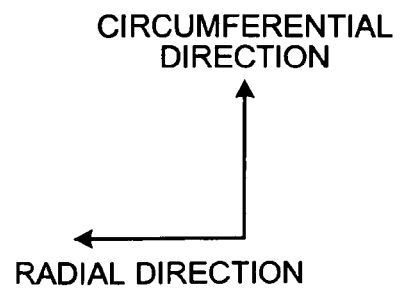
Figure 3:
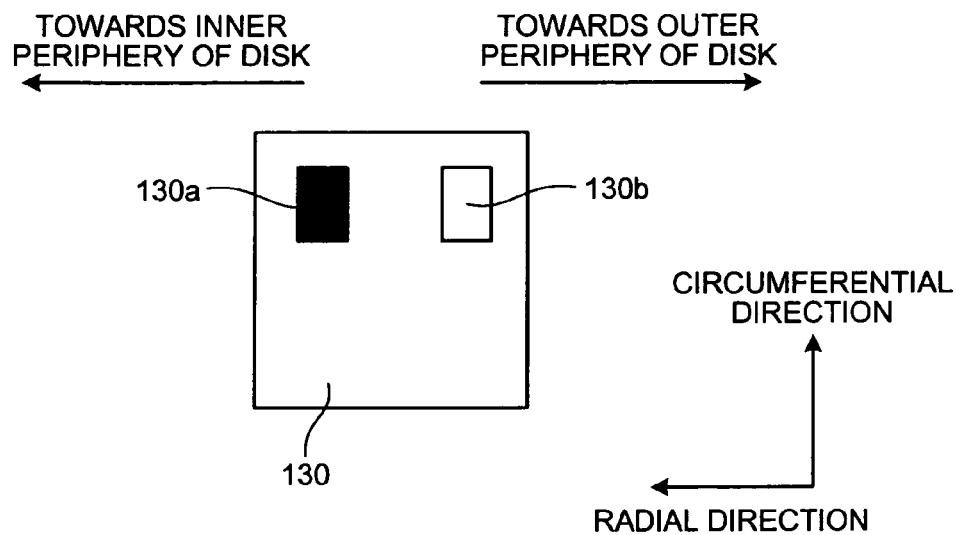
FIG. 3 is a schematic for explaining another example of relative positions of the writing element and the reading element of the head.

FIG. 2 and FIG. 3 are schematics for explaining the positions of the reading element and the writing element in the head 130. In the example of FIG. 2, a writing element 130b is provided at a specific distance from a reading element 130a towards the inner periphery of the disk 110. In the example of FIG. 3, the writing element 130b is provided at a specific distance from the reading element 130a towards the outer periphery of the disk 110.

Figure 4:
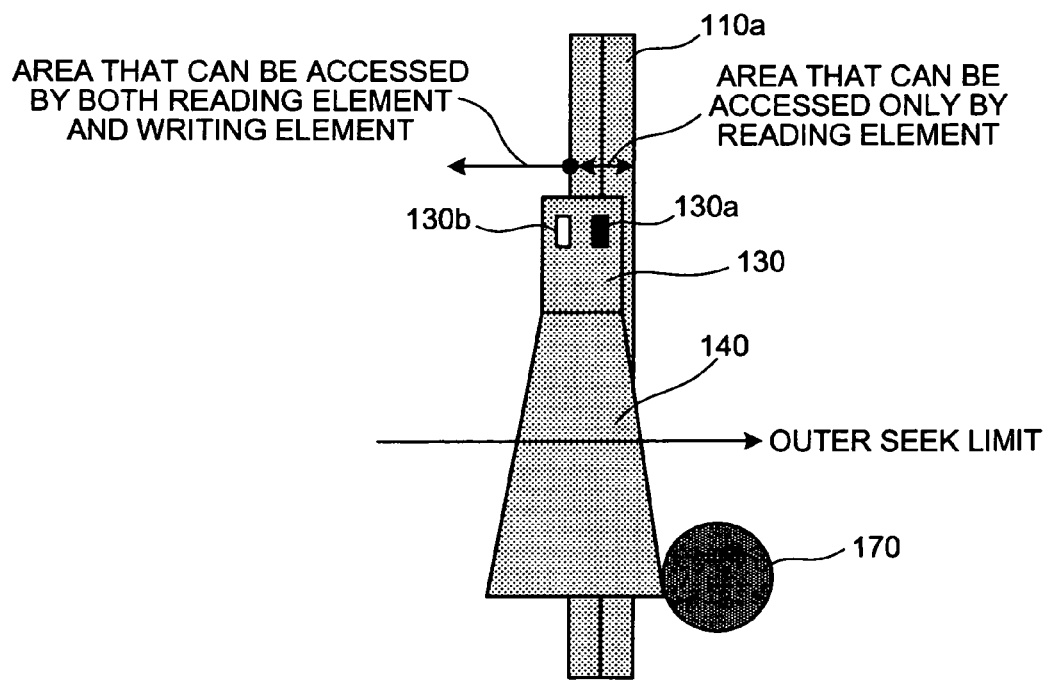
FIG. 4 is a schematic for explaining a protected area.

When the reading element 130a and the writing element 130b of the head 130 are placed as shown in FIG. 2, the outer stopper 170 is used to restrict the range of movement of the head 130, thereby enabling a protected area 110a (see FIG. 4) of the disk to remain safe. FIG. 4 is a schematic for explaining the protected area 11a. As shown in FIG. 4, the range of movement of the arm 140 that moves the head 130 is restricted by the outer stopper 170. As a result, only the reading element 130a is able to access the protected area 110a. The arm 140 is driven by the step-up motor 150 shown in FIG. 1.

Figure 5:
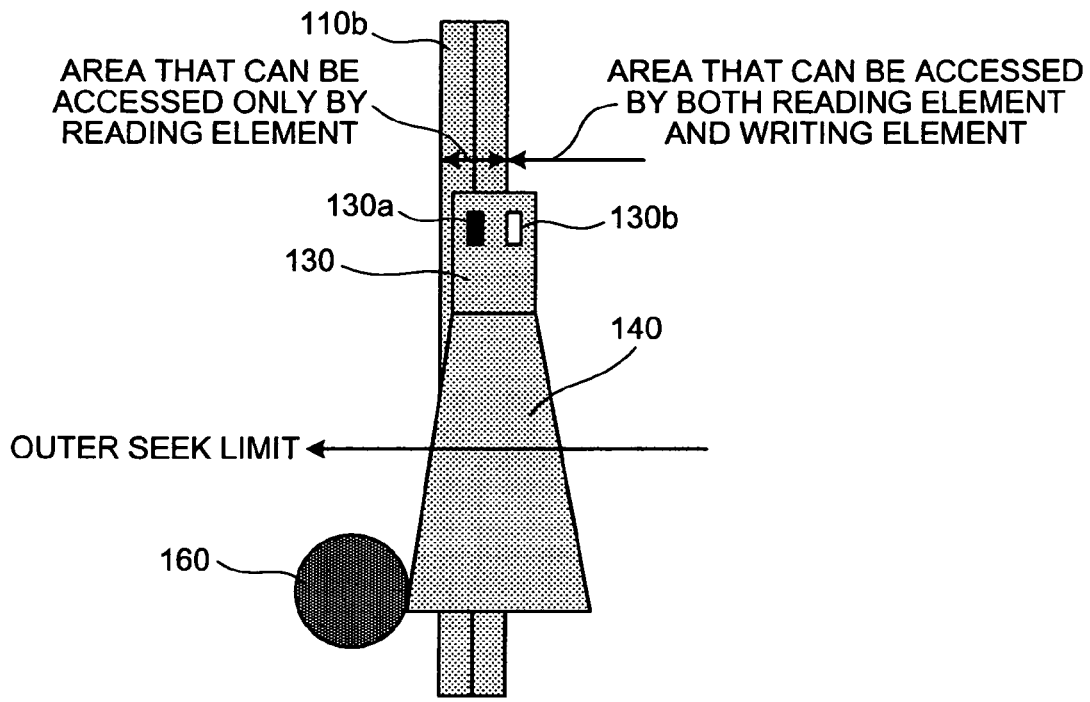
FIG. 5 is a schematic for explaining another protected area.
Figure 6A:
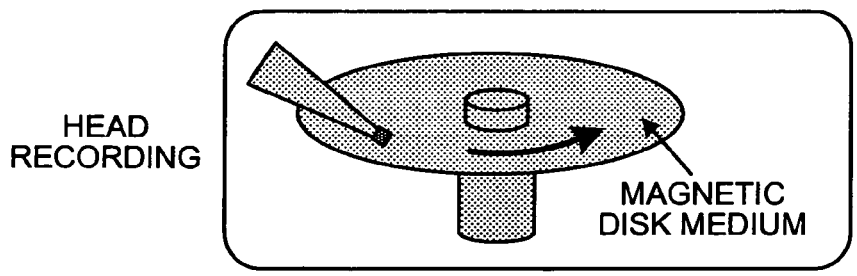
FIG. 6A and FIG. 6B are schematics for explaining the servo track writing.
Figure 6B:
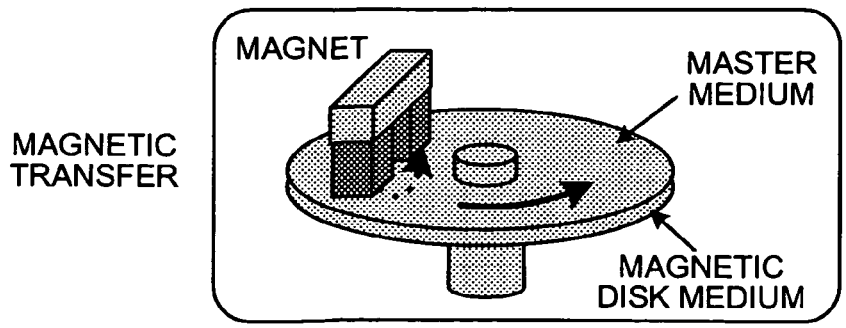

On the other hand, when the reading element 130a and the writing element 130b of the head 130 are placed as shown in FIG. 3, the range of movement of the head 130 is restricted by the inner stopper 160, thereby enabling a protected area 110b (see FIG. 5) to remain safe. FIG. 5 is a schematic for explaining the protected area 110b. As shown in FIG. 5, the range of movement of the arm 140 that moves the head 130 is restricted by the inner stopper 160, thus enabling only the reading element 130a to access the protected area 110b.

Thus, prior to shipping the disk device 100, information such as the identification information of the STW device, the identification information of the master medium used when magnetic transfer of the STW information, information (encryption key, etc.) that determines whether specific data should be written to the disk 110 (for example, whether to install a software), can be stored in the protected area 110a or 110b, rendering the data safe from tampering and erasure.

Thus, the head 130 has the reading element 130a and the writing element 130b placed apart from each other, and the inner stopper 160 and the outer stopper 170 restrict the range of movement of the head 130 in such a way that the protected areas 110a and 110b are accessible only by the reading element 130a. Consequently, important data can be stored in the protected areas 110a and 110b, eliminating the risk of erasure or tampering of the data as well as enabling correct identification of the STW device.

Further, since no special storage medium with complex structure is required and the protected areas can be provided on the disk 110 used conventionally, the manufacturing cost and manufacturing time remain the same as for the conventional storage medium.

When reading data from or writing data to a disk, a storage medium read/write device that includes a head provided with a reading unit and a writing unit placed apart from each other, restricts the range of movement of the head, and by doing so, provides a protected area on the disk accessible only by the reading unit and not by the writing unit. As a result, data stored in the protected area remains safe from tampering and erasure.

Head position information or identification information that identifies the device that has recorded servo information on the disk, etc. are stored in the protected area. Consequently, in the storage medium read/write device, it is possible to correctly identify the device that has carried out the servo track recording.

Information pertaining read/write access permission is stored in the protected area. Consequently, the storage medium read/write device affords improved security.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage medium read/write device that reads data from or writes data to a storage medium, comprising:
   a read/write unit that performs reading of data from and writing of data to the storage medium with the aid of a head provided with a writing member and a reading member placed apart from each other, the reading member being used for reading data and the writing member being used for data writing data; and
   a restricting unit that restricts a range of movement of the head,
   wherein said restricting unit comprises an inner stopper and an outer stopper positioned to create at least two protected areas on said storage medium which may be read from and not written to, and
   wherein when the storage medium is a disk, the writing member and the reading member are variably installed in such a manner that the writing member is located at a specific distance from the reading member either towards the center or towards the outer periphery of the disk, in accordance with the location of the protected areas of the disk where specific data including servo track writer (STW) information are stored, rendering the data safe from tampering and erasure.

2. The storage medium read/write device according to claim 1, wherein each of the protected areas contains therein head position information or identification information that identifies a device that has recorded head servo information on the storage medium.

3. The storage medium read/write device according to claim 1, wherein each of the protected areas contains therein information pertaining to data read/write access permission, permitting access for reading data from or writing data to the storage medium.

4. A method of reading/writing of data from/to a storage medium, comprising:
   reading/writing data from/to the storage medium with the aid of a head provided with a writing member and a reading member placed apart from each other, the reading member being used for reading data and the writing member being used for data writing data; and
   physically restricting a range of movement of the head,
   wherein said step of physically restricting the range of movement of the head uses an inner stopper and an outer stopper positioned to create at least two protected areas on said storage medium which may be read from and not written to, and
   wherein when the storage medium is a disk, the writing member and the reading member are variably installed in such a manner that the writing member is located at a specific distance from the reading member either towards the center or towards the outer periphery of the disk, in accordance with the location of the protected areas of the disk where specific data including servo track writer (STW) information are stored, rendering the data safe from tampering and erasure.

5. The method according to claim 4, further comprising writing in each of the protected areas head position information or identification information that identifies a device that has recorded head servo information on the storage medium.

6. The method according to claim 4, further comprising writing in each of the protected areas information pertaining to data read/write access permission, permitting access for reading data from or writing data to the storage medium.

* * * * *